United States Patent
Zhang et al.

(10) Patent No.: US 11,126,773 B2
(45) Date of Patent: Sep. 21, 2021

(54) METHOD FOR PARALLELED SIC POWER SWITCHING DEVICES BASED ON WIRING OPTIMIZATION

(71) Applicant: Harbin Institute of Technology, Harbin (CN)

(72) Inventors: Qianfan Zhang, Harbin (CN); Jianzhen Qu, Harbin (CN); Shumei Cui, Harbin (CN); Jinxin Wang, Harbin (CN); Xue Yuan, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 17/024,894

(22) Filed: Sep. 18, 2020

(65) Prior Publication Data
US 2021/0133381 A1 May 6, 2021

(30) Foreign Application Priority Data
Nov. 6, 2019 (CN) .......................... 201911076725.8

(51) Int. Cl.
*G06F 30/30* (2020.01)
*G06F 30/373* (2020.01)
(Continued)

(52) U.S. Cl.
CPC .......... *G06F 30/373* (2020.01); *G06F 30/394* (2020.01); *G06F 2115/12* (2020.01);
(Continued)

(58) Field of Classification Search
CPC .. G06F 30/373; G06F 30/394; G06F 2115/12; G06F 30/00–398;
(Continued)

(56) References Cited

U.S. PATENT DOCUMENTS 9,209,176 B2 * 12/2015 Wu .................. H01L 24/80
9,818,686 B2 * 11/2017 Wu .................. H01L 25/074
(Continued)

FOREIGN PATENT DOCUMENTS

CN    105914199 B  *  8/2018

OTHER PUBLICATIONS

H. Li et al., "Influence of Paralleling Dies and Paralleling Half-Bridges on Transient Current Distribution in Multichip Power Modules," IEEE Trans on Power Electronics, vol. 33, No. 8, Aug. 2018, pp. 6483-6487. (Year: 2018).*

*Primary Examiner* — Leigh M Garbowski
(74) *Attorney, Agent, or Firm* — Arent Fox LLP; Michael Fainberg

(57) ABSTRACT

The disclosure provides a design method for paralleled SiC power switching devices based on wiring optimization which belongs to the field of power electronics technology, aiming at the problem that in the existing scheme of paralleled SiC devices, the optimal performance of SiC devices cannot be presented with paralleled multiple SiC devices due to limitations of the unequal switching losses and transient currents. The design method comprises at least three wiring separation slots being arranged in parallel and in sequence on a PCB circuit board; wherein a power half-bridge composed of two SiC devices is arranged in each wiring separation slot, thereby increasing a parasitic inductance between adjacent power half-bridges. The disclosure can improve the current sharing performance of the switching transient current existing in the application of multiple paralleled SiC devices, so that SiC devices can be applied to high-power and high-current power electronic converters stably and reliably.

2 Claims, 4 Drawing Sheets

(51) Int. Cl.
*G06F 30/394* (2020.01)
*G06F 115/12* (2020.01)
*H01L 21/02* (2006.01)

(52) U.S. Cl.
CPC .............. *H01L 21/02378* (2013.01); *H01L 2924/10272* (2013.01)

(58) Field of Classification Search
CPC . G06F 2115/00–12; G06F 2119/00–22; H01L 21/02378; H01L 2924/10272; H02M 3/00; H02M 3/003; H02M 7/00; H02M 7/003
See application file for complete search history.

(56) References Cited

U.S. PATENT DOCUMENTS

| | | | | |
|---|---|---|---|---|
| 9,960,698 | B2* | 5/2018 | Nagashima | H02J 3/14 |
| 10,212,838 | B2* | 2/2019 | McPherson | H01L 25/18 |
| 10,355,611 | B2* | 7/2019 | Nagashima | H02J 3/38 |
| 10,405,450 | B2* | 9/2019 | McPherson | H01L 25/18 |
| 10,651,719 | B2* | 5/2020 | Gloes | H02M 1/08 |
| 10,692,860 | B2* | 6/2020 | Fujita | H01L 29/7802 |
| 10,784,235 | B2* | 9/2020 | McPherson | H01L 23/3735 |

* cited by examiner

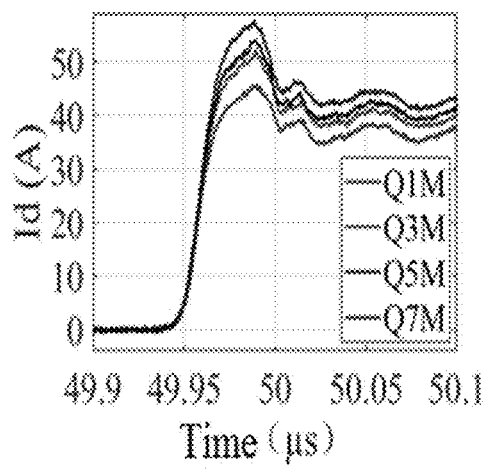
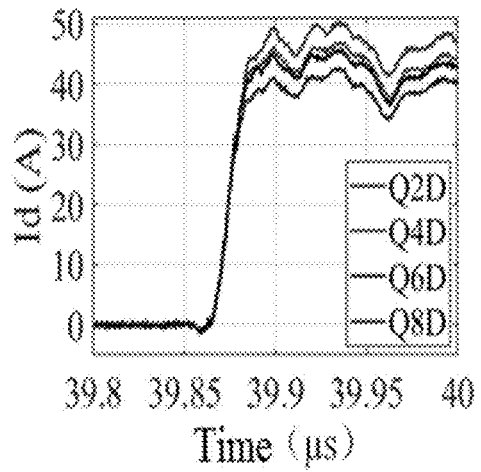
FIG. 5 (Prior Art)         FIG. 6 (Prior Art)
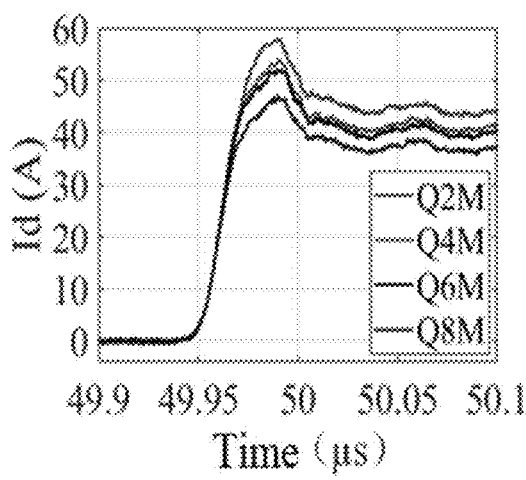
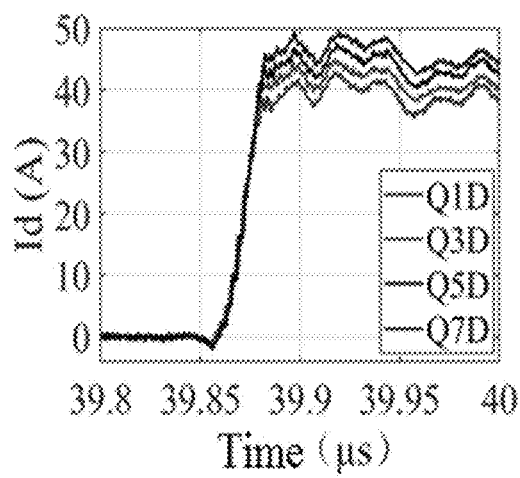
FIG. 7 (Prior Art)         FIG. 8 (Prior Art)

US 11,126,773 B2

METHOD FOR PARALLELED SIC POWER SWITCHING DEVICES BASED ON WIRING OPTIMIZATION

CROSS REFERENCE TO RELATED APPLICATION

This application claims the priority of Chinese Patent Application No. 201911076725.8, entitled "Design Method for Paralleled SiC Power Switching Devices Based on Wiring Optimization" filed with the Chinese Patent Office on Nov. 6, 2019, which is incorporated herein by reference in its entirety.

TECHNICAL FIELD

The disclosure relates to a design method for paralleled SiC power switching devices based on wiring optimization, which belongs to the technical field of power electronics.

BACKGROUND

Silicon carbide (SiC) power switching devices can break through the performance limits of existing silicon devices in three directions: higher blocking voltage, higher operating temperature, and higher switching speed. The use of SiC devices in power electronic converters can significantly improve system efficiency and reduce the volume and weight of cooling and heat dissipation systems and passive filter components, thereby significantly improving system power density.

A single SiC device usually has a low current capacity. In order to apply SiC devices to high-power and high-current power electronic converters, multiple SiC devices are required to be connected in parallel. However, the unequal switching losses and transient current overshoots existing between paralleled SiC devices will limit the maximum switching frequency and the maximum current capacity of the paralleled unit, thus failing to present the best performance of SiC devices.

Therefore, the existing scheme of paralleled SiC devices has two problems: 1. the number of paralleled devices is usually less than 3, which limits the maximum current capacity of the paralleled unit; 2. additional auxiliary devices are usually required to be added, such as power coupling inductors, high-bandwidth current sensors, etc., which will increase the cost of the system, and at the same time increase the complexity of the system, thereby reducing the reliability of the overall system.

SUMMARY

Due to limitations of unequal switching losses and transient currents, the optimal performance of SiC devices cannot be presented when multiple SiC devices are connected in parallel. Aiming at the above problem that in the existing scheme of paralleled SiC devices, the disclosure provides a design method for paralleled SiC power switching devices based on wiring optimization.

The design method for paralleled SiC power switching devices based on wiring optimization of the disclosure, comprises at least three wiring separation slots being arranged in parallel and in sequence on a PCB circuit board; wherein a power half-bridge composed of two SiC devices is arranged in each wiring separation slot, thereby increasing a parasitic inductance between adjacent power half-bridges.

According to the design method for paralleled SiC power switching devices based on wiring optimization of the disclosure, two DC capacitors are connected in parallel between the two SiC devices.

According to the design method for paralleled SiC power switching devices based on wiring optimization of the disclosure, a number of the wiring separation slots is four, and eight SiC devices and eight DC capacitors within the four wiring separation slots form a half-bridge unit.

The design method for paralleled SiC power switching devices based on wiring optimization according to the disclosure further comprises a design of a driving circuit; wherein the driving circuit uses a laminated busbar wiring way to reduce a difference between loop parasitic inductances of the driving circuit, so that a same drive signal can be applied to each paralleled SiC device.

The beneficial effects of the disclosure: the method of the disclosure can improve the current sharing performance of the switching transient current existing in an application of multiple paralleled SiC devices, so that the SiC devices can be stably and reliably applied to high-power and high-current power electronic converters.

The disclosure is suitable for the design of a large number of paralleled SiC power switching devices, which can improve the transient current sharing performance existing in an application of multiple paralleled SiC devices by adding separation slots in the layout of the power circuit without adding additional auxiliary devices, thereby reducing the cost and complexity of the system.

BRIEF DESCRIPTION OF THE DRAWINGS

FIG. 5 is an experimental test waveform diagram of the turn-on transient current of the upper switching devices in the existing SiC paralleled half-bridge; where the Q1M, Q3M, Q5M and Q7M represent the channels of the SiC MOSFETs Q1, Q3, Q5 and Q7 as shown in FIG. 2 respectively, and Id represents the turn-on transient current;

FIG. 6 is an experimental test waveform diagram of the turn-on transient current of the lower body-diodes in the existing SiC paralleled half-bridge; where the Q2D, Q4D, Q6D and Q8D represent the body-diodes of the SiC MOSFETs Q2, Q4, Q6 and Q8 as shown in FIG. 2 respectively;

FIG. 7 is an experimental test waveform diagram of the turn-on transient current of the lower switching devices in the existing SiC paralleled half-bridge; where the Q2M, Q4M, Q6M and Q8M represent the channels of the SiC MOSFETs Q2, Q4, Q6 and Q8 as shown in FIG. 2 respectively;

FIG. 8 is an experimental test waveform diagram of the turn-on transient current of the upper body-diodes on the existing SiC paralleled half-bridge; where the Q1D, Q3D, Q5D and Q7D represent the body-diodes of the SiC MOSFETs Q1, Q3, Q5 and Q7 as shown in FIG. 2 respectively;

DETAILED DESCRIPTION OF THE EMBODIMENTS

The technical solutions in the embodiments of the disclosure will be clearly and completely described below in conjunction with the accompanying drawings in the embodiments of the disclosure. Obviously, the described embodiments are only a part of the embodiments of the disclosure, rather than all the embodiments. Based on the embodiments of the disclosure, all other embodiments obtained by those of ordinary skill in the art without creative work shall fall within the protection scope of the disclosure.

It should be noted that the embodiments of the disclosure and the features in the embodiments can be combined with each other without confliction.

The disclosure will be further described below in conjunction with the accompanying drawings and specific embodiments, which is not a limitation of the disclosure.

Embodiment 1

Figure 1:
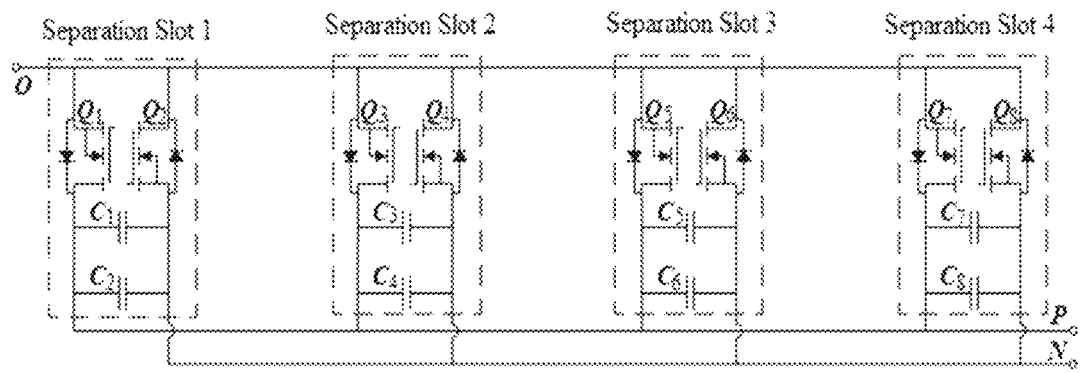
FIG. 1 is a schematic diagram of the paralleled SiC power switching devices designed by the method of the disclosure; wherein the dotted frame in FIG. 1 represents the wiring separation slots.
Figure 2:
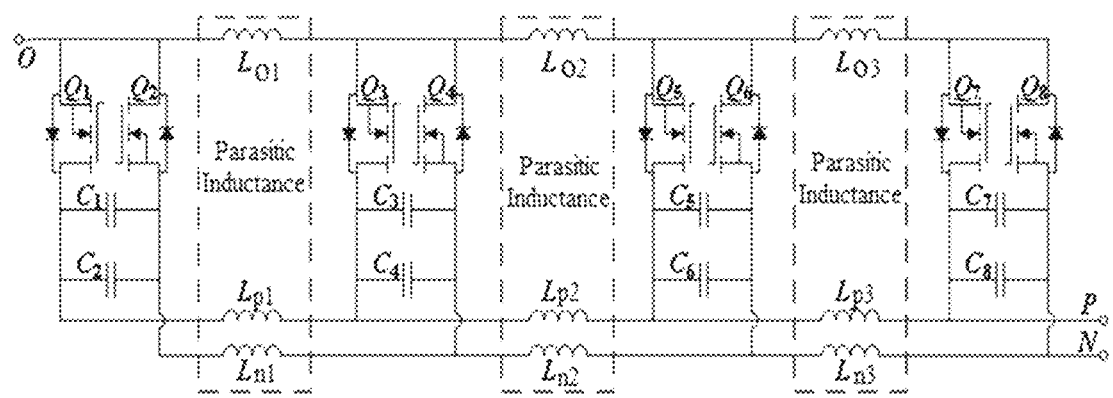
FIG. 2 is a schematic diagram showing parasitic inductance between adjacent wiring separation slots in FIG. 1.

As shown in FIG. 1 and FIG. 2, the disclosure provides a design method for paralleled SiC power switching devices based on wiring optimization, comprising at least three wiring separation slots being arranged in parallel and in sequence on a PCB circuit board; wherein a power half-bridge composed of two SiC devices is arranged in each wiring separation slot, thereby increasing a parasitic inductance between adjacent power half-bridges.

In this embodiment, the wiring separation slots are arranged mainly for purpose of increasing parasitic inductances between several paralleled half-bridges, such as $L_{p1}$, $L_{p2}$, $L_{p3}$, $L_{n1}$, $L_{n2}$, $L_{n3}$, $L_{o1}$, $L_{o2}$, $L_{o3}$ shown in FIG. 2. The increased parasitic inductance can reduce the transient coupling of several paralleled SiC devices during the switching process, so that the several paralleled SiC devices have the same switching transient conditions, thereby improving the transient current sharing characteristics.

Further, as shown in FIG. 1 and FIG. 2, two DC capacitors are connected in parallel between two SiC devices.

In this embodiment, as shown in FIG. 1, a total of four wiring separation slots are provided on the circuit board. The first wiring separation slot taken as an example is provided with DC capacitors ($C_1$ and $C_2$) arranged in a distributed manner and a power half-bridge composed of two SiC devices ($Q_1$ and $Q_2$). Similarly, the second wiring separation slot is provided with two SiC devices ($Q_3$ and $Q_4$) and DC capacitors ($C_3$ and $C_4$) arranged in a distributed manner; the third wiring separation slot is provided with two SiC devices ($Q_5$ and $Q_6$) and DC capacitors ($C_5$ and $C_6$) arranged in a distributed manner; and the fourth wiring separation slot is provided with two SiC devices ($Q_7$ and $Q_8$) and DC capacitors ($C_7$ and $C_8$) arranged in a distributed manner. In FIG. 1, P represents an external connection input terminal of the half-bridge module for a positive voltage, N represents an external connection input terminal of the half-bridge module for a negative voltage, and O represents an external connection output terminal of the half-bridge module.

The wiring separation slots can decouple capacitors arranged in the distributed manner during the switching transient of the SiC devices, so that the several paralleled SiC devices can have the same switching transient conditions, thereby improving the transient current sharing characteristics.

Figure 3:
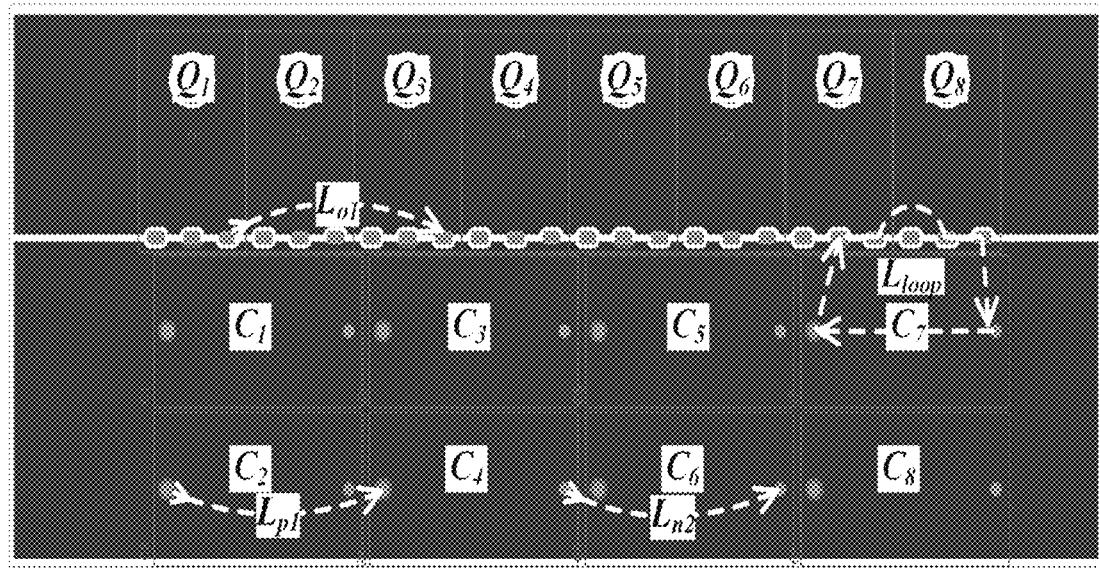
FIG. 3 is a schematic diagram of the parasitic inductance between existing paralleled SiC devices of a PCB layout without wiring optimization.
Figure 4:
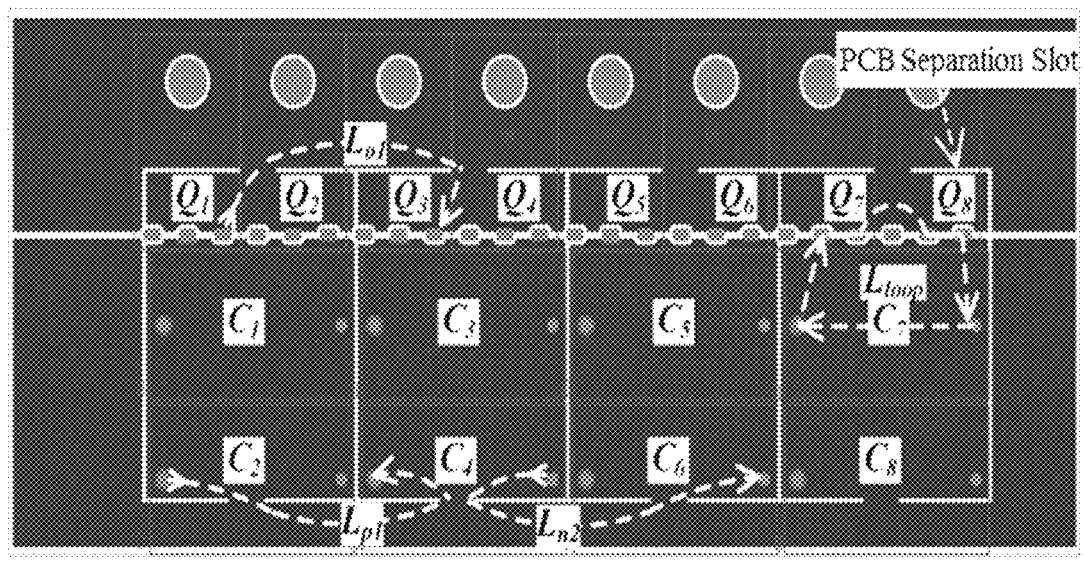
FIG. 4 is a schematic diagram of the parasitic inductance between paralleled SiC devices on a PCB layout designed by the method of the disclosure; wherein the PCB separation slot in the FIG. 4 is the wiring separation slot.
Figure 9:
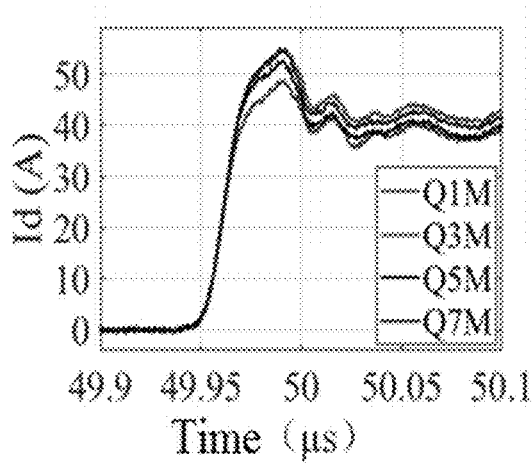
FIG. 9 is an experimental test waveform diagram of the turn-on transient current of the upper switching devices in the SiC paralleled half-bridge designed by the method of the disclosure.
Figure 10:
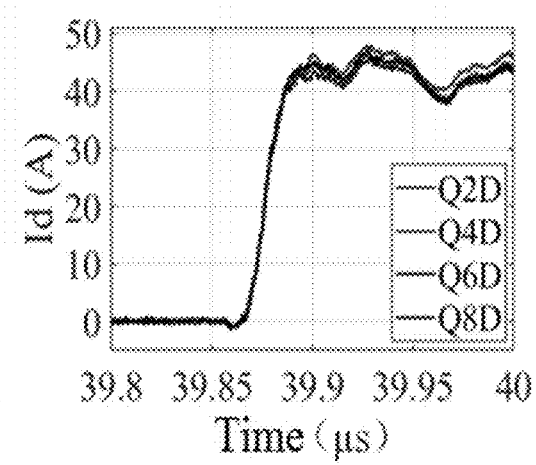
FIG. 10 is an experimental test waveform diagram of the turn-on transient current of the lower body-diodes in the SiC paralleled half-bridge designed by the method of the disclosure.
Figure 11:
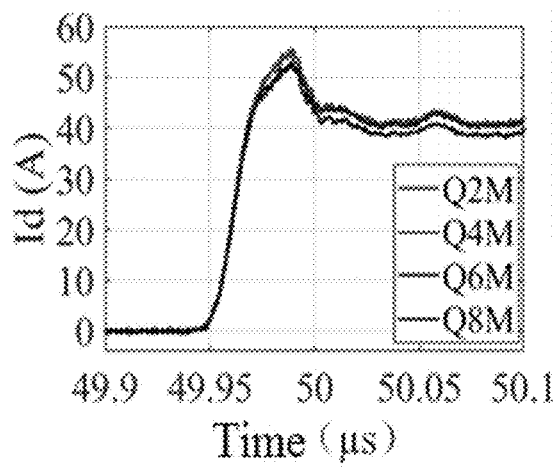
FIG. 11 is an experimental test waveform diagram of the turn-on transient current of the lower switching devices in the SiC paralleled half-bridge designed by the method of the disclosure.
Figure 12:
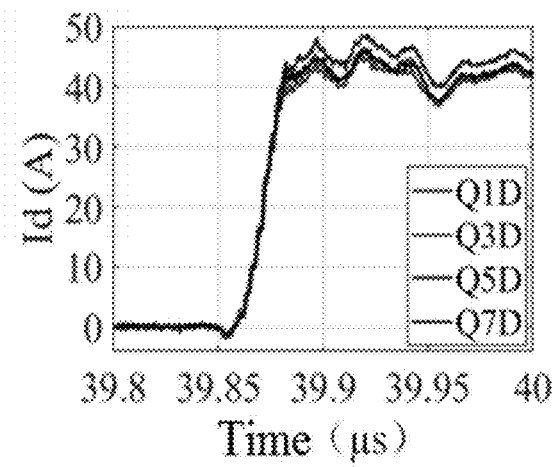
FIG. 12 is an experimental test waveform diagram of the turn-on transient current of the upper body-diodes in the SiC paralleled half-bridge designed by the method of the disclosure.

FIG. 3 shows an existing scheme of paralleled SiC devices, in which the parasitic inductances between several paralleled units, such as $L_{p1}$, $L_{n2}$, $L_{o1}$, will be very small, as shown in the following Table I. After adopting the wiring separation slots, as shown in FIG. 4, the path lengths of the parasitic inductances between several power half-bridges, such as $L_{p1}$, $L_{n2}$, $L_{o1}$, increase, so that the inductances also increase, as shown in the following Table II.

TABLE I

| | Traditional layout | | | | | | | | |
|---|---|---|---|---|---|---|---|---|---|
| | $L_{p1}$ | $L_{p2}$ | $L_{p3}$ | $L_{n1}$ | $L_{n2}$ | $L_{n3}$ | $L_{o1}$ | $L_{o2}$ | $L_{o3}$ |
| parasitic inductance (nH) | 7.17 | 7.09 | 7.08 | 6.94 | 6.95 | 6.50 | 6.80 | 6.86 | 6.79 |

TABLE II

| | the separation slots being adopted | | | | | | | | |
|---|---|---|---|---|---|---|---|---|---|
| | $L_{p1}$ | $L_{p2}$ | $L_{p3}$ | $L_{n1}$ | $L_{n2}$ | $L_{n3}$ | $L_{o1}$ | $L_{o2}$ | $L_{o3}$ |
| parasitic inductance (nH) | 13.18 | 13.04 | 12.95 | 13.18 | 13.12 | 12.99 | 14.30 | 14.34 | 14.31 |

Table I corresponds to the parasitic inductances in FIG. 3 while Table II corresponds to the parasitic inductances in FIG. 4. It can be seen from the values in the tables that the parasitic inductances corresponding to FIG. 4 can approximately double those corresponding to FIG. 3. That is to say, the original current paths have been changed after adding the separation slots, thus increasing the parasitic inductances.

$L_{loop}$ in FIG. 4 represents a loop parasitic inductance within the wiring separation slot, which is required to be as small as possible.

Still further, as an example, there are four wiring separation slots, in which eight SiC devices and eight DC capacitors forms a half-bridge unit.

This embodiment is not limited to a form of eight SiC devices, where more or less than eight SiC devices are equally applicable. Corresponding to the power half-bridge composed of each two SiC devices, one wiring separation slot can be provided accordingly.

The size and separation distance of the adjacent wiring separation slots should be exactly the same, to ensure that the parasitic inductances between the separation slots are the same, so as to evenly reduce the transient coupling of several paralleled SiC devices during the switching process.

Still further, this embodiment also comprises a design of a driving circuit; wherein the driving circuit uses a laminated busbar wiring way to reduce the difference between loop parasitic inductances the driving circuit, so that the same drive signal can be applied to several paralleled SiC devices.

The wiring method of the driving circuit can reduce the difference in path propagation delays of several driving signals, so that the same switch driving signal can be synchronously applied to several paralleled SiC devices.

The SiC devices and the DC capacitors are installed on the power board. The driving circuit is arranged on the driving board which can be independently installed above the power board.

As shown in FIGS. 5 to 12, in order to verify the current sharing effect of the paralleled unit of SiC devices proposed in the disclosure, comparative experiments are carried out under experimental conditions with a voltage of 800 V and a current of 200 A. Herein, FIG. 5 corresponds to FIG. 9, FIG. 6 corresponds to FIG. 10, FIG. 7 corresponds to FIG. 11, and FIG. 8 corresponds to FIG. 12, and it can be seen from these figures that after the circuit layout is optimized by the method of the disclosure, the current sharing characteristics of currents between paralleled SiC devices has a significant improvement. Taking FIG. 7 corresponding to FIG. 11 as an example, the difference in transient current overshoots is reduced from 14.37% in FIG. 7 to 2.78% in FIG. 11.

In summary, the method of the disclosure can be applied to an application where multiple (more than 3) SiC devices are connected in parallel, so that the SiC devices can be applied in the field of high-power and high-current power electronic converters.

Although the disclosure is described herein with reference to specific embodiments, it should be understood that these embodiments are merely examples of the principles and applications of the disclosure. Therefore, it should be understood that many modifications can be made to the exemplary embodiments, and other arrangements can be devised without deviating from the spirit and scope of the disclosure as defined by the appended claims. It should be understood that different dependent claims and features described herein can be combined in ways different from those described in the original claims. It can also be understood that the features described in combination with a single embodiment can be used in other embodiments.

The invention claimed is:

1. A design method for paralleled SiC power switching devices based on wiring optimization, comprising:
   at least three wiring separation slots being arranged in parallel and in sequence on a PCB circuit board; wherein a power half-bridge composed of two SiC devices is arranged in each wiring separation slot, and two DC capacitors are connected in parallel between the two SiC devices, thereby increasing a parasitic inductance between adjacent power half-bridges.

2. The design method for paralleled SiC power switching devices based on wiring optimization according to claim 1, wherein a number of the wiring separation slots is four, and eight SiC devices and eight DC capacitors within the four wiring separation slots form a half-bridge unit.

* * * * *

UNITED STATES PATENT AND TRADEMARK OFFICE
CERTIFICATE OF CORRECTION

PATENT NO. : 11,126,773 B2  
APPLICATION NO. : 17/024894  
DATED : September 21, 2021  
INVENTOR(S) : Qianfan Zhang et al.

Page 1 of 1

It is certified that error appears in the above-identified patent and that said Letters Patent is hereby corrected as shown below:

On the Title Page

Item (54) and In the Specification, Column 1, Line 1, The Title reads:
"METHOD FOR PARALLELED SIC POWER SWITCHING DEVICES BASED ON WIRING OPTIMIZATION"

Should read:
-- DESIGN METHOD FOR PARALLELED SIC POWER SWITCHING DEVICES BASED ON WIRING OPTIMIZATION --

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*